United States Patent
Miller et al.

(10) Patent No.: US 9,309,140 B2
(45) Date of Patent: Apr. 12, 2016

(54) P-SWITCH PILOT OPERATING AIR SUPPLY CONTROLLER

(71) Applicants: Lancelot Hudson Miller, Cham (CH); Sten Bergsten, Sundsvall (SE); Arne Stenholm, Sundsvall (SE); Eliseo Angelo Di Nitto, Albisola Superiore SV (IT); Nils-Goran Akerberg, Sundsvall (SE)

(72) Inventors: Lancelot Hudson Miller, Cham (CH); Sten Bergsten, Sundsvall (SE); Arne Stenholm, Sundsvall (SE); Eliseo Angelo Di Nitto, Albisola Superiore SV (IT); Nils-Goran Akerberg, Sundsvall (SE)

(73) Assignee: Emhart Glass S.A., Cham (CH)

( * ) Notice: Subject to any disclaimer, the term of this patent is extended or adjusted under 35 U.S.C. 154(b) by 232 days.

(21) Appl. No.: 13/713,229

(22) Filed: Dec. 13, 2012

(65) Prior Publication Data

US 2013/0180286 A1  Jul. 18, 2013

Related U.S. Application Data

(60) Provisional application No. 61/586,892, filed on Jan. 16, 2012.

(51) Int. Cl.
*C03B 9/30* (2006.01)
*C03B 9/40* (2006.01)

(52) U.S. Cl.
CPC . *C03B 9/30* (2013.01); *C03B 9/403* (2013.01); *C03B 9/406* (2013.01); *G05B 2219/2635* (2013.01)

(58) Field of Classification Search
CPC ...... C03B 9/14; C03B 9/3627; C03B 3/3636; C03B 9/403; C03B 9/406
USPC ........................................ 65/29.1, 29.12, 160
See application file for complete search history.

(56) References Cited

U.S. PATENT DOCUMENTS

| | | | |
|---|---|---|---|
| 3,015,189 A | 1/1962 | Russell | |
| 3,867,122 A | 2/1975 | Miller | |
| 5,857,401 A | 1/1999 | Corves et al. | |
| 2004/0050101 A1* | 3/2004 | Bauer et al. | 65/29.11 |

* cited by examiner

*Primary Examiner* — Queenie Dehghan
(74) *Attorney, Agent, or Firm* — Reinhart Boerner Van Deuren s.c.

(57) ABSTRACT

There is provided a system of an individual section machine (IS) having a blow side with a mold and a blow head, and a blank side, the system includes a P-Switch valve in fluid communication with an EPVB of the IS machine and with the P-Switch valve configured to control a valve pilot air supply to a predetermined pilot valve. When the P-Switch valve is activated, the blow side mold is set to an OPEN position and the associated blow head is set to an UP position. With the P-Switch valve of the system activated, the blow side machinery cannot be overridden from the blank side of the IS machine.

9 Claims, 3 Drawing Sheets

P-SWITCH PILOT OPERATING AIR SUPPLY CONTROLLER

IDENTIFICATION OF RELATED APPLICATIONS

This patent application claims priority of U.S. Provisional Patent Application No. 61/586,892, filed on Jan. 16, 2012, which is entitled "P-Snap Pilot Operating Air Supply Controller," which patent application with its attached Appendix is hereby incorporated herein by reference in its entirety.

BACKGROUND OF THE INVENTION

Field of the Invention

The present invention relates to an individual section (IS) machine for making glass containers, more specifically to a P-Switch valve (P-Switch) pilot operating air supply controller on the blow side of the IS machine.

Glass containers are made in a manufacturing process that has three distinct operations, namely the batch house, the hot end, and the cold end. The batch house is where the raw materials for glass (which are typically sand, soda ash, limestone, feldspar, cullet (crushed, recycled glass), and other raw materials) are prepared and mixed into batches. The hot end begins with a furnace, in which the batched materials are melted into molten glass, and from which a stream of molten glass flows.

The molten glass is cut with a shearing blade into uniform segments of glass called gobs, which fall by gravity and are guided through troughs and chutes into blank molds. In the blank molds, a pre-container referred to as a parison is formed, either by using a metal plunger to push the glass into the blank mold, or by blowing the glass out from below into the blank mold. The parison is inverted and transferred to a mold, where the parison is blown out into the shape of the container. Typically, the manufacturing process is performed in an Individual Section or IS forming machine, which contains between five and twenty-six identical sections, each of which is capable of making one, two, three, or four containers simultaneously.

The hot end also includes an annealing process which prevents the containers from having weakened glass caused by stresses caused by uneven cooling. The annealing process is used to achieve even cooling, using an annealing oven or Lehr to heat the containers, and then slowly cool them over a twenty to sixty minute period.

It is known to provide a blow station (a/k/a blow side) where an apparatus is used to blow a parison and then cool the blown parison to form a glass container. The parison is removed from a blank mold where it was formed by an invert mechanism which inverts the parison to a right-side-up orientation, and places the parison to a right-side-up orientation, and places the parison into a blow mold with its finish (the portion of the parison located above its neck) extending from the top of the blow mold. A blow head is brought into position on top of the blow mold at the blow station to engage the parison's finish, and the blow head provides air under pressure (referred to an "final blow" air) through a blow tube extending from the blow head downwardly into the interior of the parison at the top end thereof to blow the parison into contact with the interior of the blow mold, thereby creating a blown parison with the morphology of the interior of the blow mold.

The blown parison is then cooled to the point where it is sufficiently rigid to be gripped and removed from the blow station by a takeout mechanism without sagging or otherwise becoming deformed. The outer surface of the blown parison is cooled by cooling the blow mold and the inner surface of the blown parison is cooled by internal cooling air which flows through the blow tube into the blown parison. The cooling air escapes from the interior of the bottle through a permanently open adjustable exhaust in the blow head.

At times a container may have to be removed from the blow side of the IS machine because of a deformity or collapse. Such collapse may be caused by improper mold temperature. In such circumstances, the operator activates P-Switch valves (also referred to as P-Snap valves) to open the blow mold and move the blow head up allowing the operation to remove the defective container. Because of the high temperature of the machinery and the glass container, an operator may be injured if the IS machine unexpectedly started up during the remove operation.

The European Union instituted specific regulations to require measures to prevent unexpected start-up or movement of the blow side of an IS machine in European Standard EN 13042-3, 2007, specifically English version section 5.4.

The apparatus of the present invention must also be of construction which is both durable and long lasting, and it should also require little or no maintenance to be provided by the user throughout its operating lifetime. In order to enhance the market appeal of the apparatus of the present invention, it should also be of inexpensive construction to thereby afford it the broadest possible market. Finally, it is also desirable that all of the aforesaid advantages be achieved without incurring any substantial relative disadvantage.

The subject matter discussed in this background of the invention section should not be assumed to be prior art merely as a result of its mention in the background. Similarly, a problem mentioned in the background section or associated with the subject matter of the background of the invention section should not be assumed to have been previously recognized in the prior art. The subject matter in the background section merely represents different approaches, which in and of themselves may also be inventions.

SUMMARY OF THE INVENTION

The disadvantages and limitations of the background art discussed above are overcome by the present invention.

There is provided a system of an individual section machine (IS) having a blow side with a mold and a blow head, and a blank side, the system includes a P-Switch valve in fluid communication with an EPVB of the IS machine and with the P-Switch valve configured to control a valve pilot air supply to a predetermined pilot valve. When the P-Switch valve is activated, the blow side mold is set to an OPEN position and the associated blow head is set to an UP position. With the P-Switch valve of the system activated, the blow side machinery cannot be overridden from the blank side of the IS machine.

There is provided a system to control the operation of a blow head and blow mold in at least one section on the blow side of an IS machine. The system to control is used when a defective container in a mold must be removed. The IS machine includes a blank side with a blank side pilot air supply and an EPVB having an operation valve and a pilot valve coupled to one of the blow head and blow mold. The system includes a P-Switch valve mounted on the blow side of the IS machine, with the P-Switch valve coupled to the EPVB and the blank side pilot air supply. A piping network couples the P-Switch valve to the pilot valve and to the blank side pilot air supply. The P-Switch valve and the piping network are configured to prevent operation of the blow side mold and blow head from the blank side of the IS machine until the defective container is removed.

The system to control the operation of an IS machine may further include an additional P-Switch valve coupled to the piping network and the EPVB of the at least one section. One P-Switch valve is coupled to the blow head and one P-Switch valve is coupled to the blow mold. Each respective P-Switch valve is configured to set the blow head in an UP position and set the blow mold to an OPEN position. In one embodiment the blank side pilot air supply of the IS machines connected directly to each P-Switch valve through the piping network.

There is further provided a method for controlling an IS machine when a defective container in a mold must be removed. The IS machine includes at least one section having a blow side and a blank side and with the IS machine including an EPVB for controlling operation of a selective blow head and blow mold. The method includes removing a blow side operating valve, blow side low pressure manifold, and a blow side exhaust manifold that for each coupled to the blow head and blow mold. It further includes installing a piping network on the IS machine. The piping network is in fluid communication with a blow side P-Switch valve, the EPVB, and a blank side pilot air supply. The piping network and the blow side P-Switch valve are configured to prevent operation of the blow mold and blow head from the blank side of the IS machine until the defective container is removed.

Another embodiment of the method for controlling an IS machine includes coupling one additional P-Switch valve to the piping network and the EPVB of the at least one section. One P-Switch valve is coupled to the blow mold and one P-Switch valve is coupled to the blow head. Each of the respective P-Switch valves is configured to set the blow mold to an OPEN position and the blow head in an UP position. In another embodiment, the blank side pilot air supply of the IS machines directly coupled to each P-Switch valve through the piping network.

The apparatus of the present invention is of a construction which is both durable and long lasting, and which will require little or no maintenance to be provided by the user throughout its operating lifetime. Finally, all of the aforesaid advantages are achieved without incurring any substantial relative disadvantage.

DESCRIPTION OF THE DRAWINGS

These and other advantages of the present invention are best understood with reference to the drawings, in which.

DETAILED DESCRIPTION OF THE EXEMPLARY EMBODIMENTS

Figure 1:
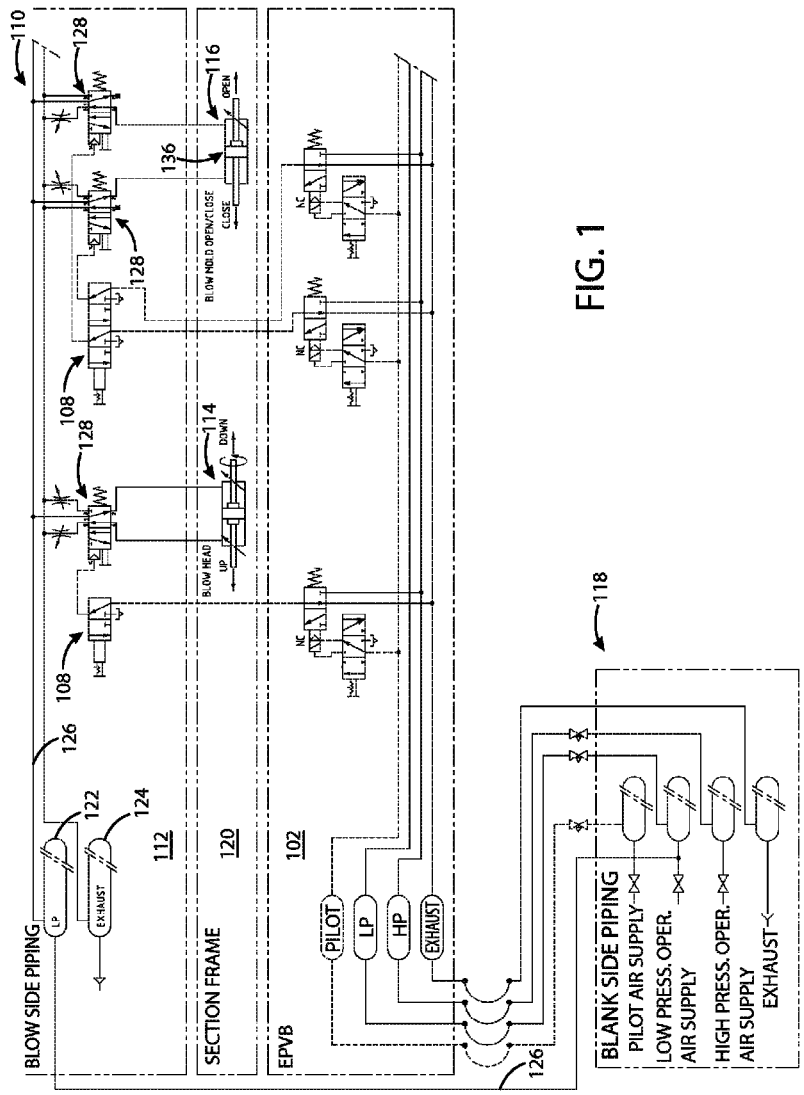
FIG. 1 is a schematic diagram of an IS machine having at least one section including a blow head and blow mold, with the blow head and blow mold controlled with a blow side operating valve coupled to a blank side low pressure operating air supply through a blow side low pressure air manifold, with a P-Switch valve coupled to the blow side operating valve and providing an operating pilot signal from an EPVB.

An IS machine 110 includes a blank side 118 and a blow side 112 constituting a section 120. A typical IS machine 110 can include 26 sections operating at the same time.

In an IS machine 110 there are P-Switch valves 108 installed on the blow side 112 of the IS machine 110 as part of the control system for a blow head 114 and a blow mold 116 for a given section 120.

Such P-Switch valves 108 are coupled to a low pressure operating air supply on the blank side 118 of the IS machine 110 through a low pressure manifold 122 on the blow side 112 of the IS machine 110. The blow head 114 and blow mold 116 in a section 120 of the IS machine 110 are also coupled to the low pressure air supply manifold 122 through valves 128 coupled to the P-Switch valve 108.

If the machine operator detects or is informed that a glass container 136 in one of the molds of a specific section has collapsed, the operator will activate the P-Switch valves 108 to stop the running of a specific section 120 of the IS machine 110 so that the blow head 114 moves to an UP position and the blow mold 116 moves to an OPEN position. The operator then, typically using tongs, removes the collapsed container 136 from the blow mold 116. A collapsed container can occur because of improper mold temperatures, for example steady state process condition has not been reached, or other defect detected in the blow mold process.

The above-described situation, even though the machinery for a given section has stopped and the blow mold is open and the blow head is in the up position, there is a possibility that an inadvertent reactivation of the IS machine section can occur exposing the machine operator to injury.

In an effort to avoid injuries to operators of such machinery, the European Union has instituted a European Standard EN13042-3:2007 which also is a Swedish standard. The official English version of EN13042-3:2007 is set forth in Section 5.4 entitled "Prevention of Unexpected Movement of Individual Mechanisms." That provision provides that measures against unexpected start-up and movements shall be present on the appropriate side of each manufacturing section which are capable of preventing unintentional or erroneous triggered movement of each of the individual mechanisms designated in the blank mold side of an IS machine and on the blow mold side of an IS machine.

In response to the above requirement, the present invention presents a system 100 designed to cut the pilot air supply 132, individually, to specific pilot valve functions in the electropneumatic valve block (EPVB) 102 of an IS machine 110. The system 100 will lock out, in the "normal position" for a specific valve. For example, the blow mold close and blow head function would be blocked, pneumatically, from the blow side 112 of the IS machine 110. When the P-Switch valve 108 is activated the blow molds 116 are set to OPEN and the blow head 114 is set to its UP position. The system 100 provides that when the P-Switch valve 108 is activated, the motion of the IS machine 110, i.e., close the blow mold and/or move the blow head down cannot be overridden from the blank side 118 of the IS machine 110. The system 100 further provides that even though there are overrides for the blow molds 116 and the blow head 114 that can be activated on the EPVB 102 of the IS machine 110, the blow molds 116 and blow head 114 can be operated only by switching the P-Switch valve 108 on or off as the case may be.

Figure 2:
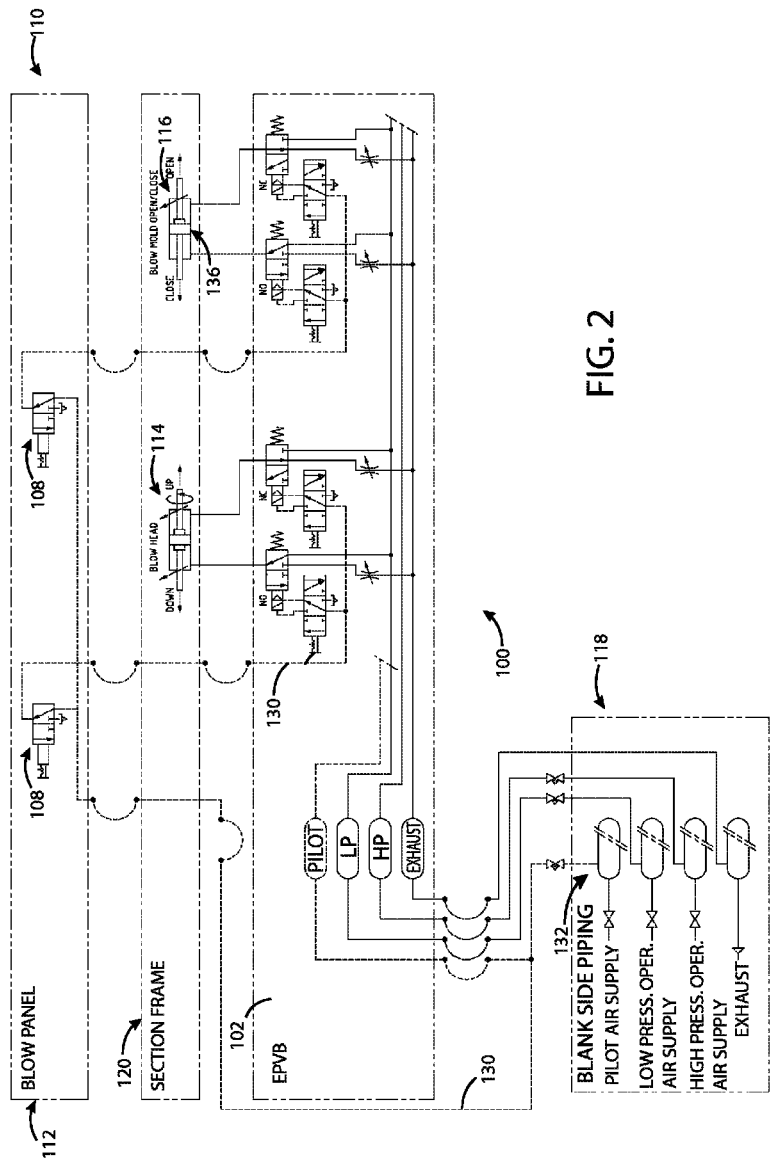
FIG. 2 is a schematic diagram of an IS machine illustrated in FIG. 1 with the P-Switch valve on the blow side of the IS machine coupled to the EPVB controlling the blow head and blow mold with blank side pilot air supplied through the P-Switch valve.
Figure 3:
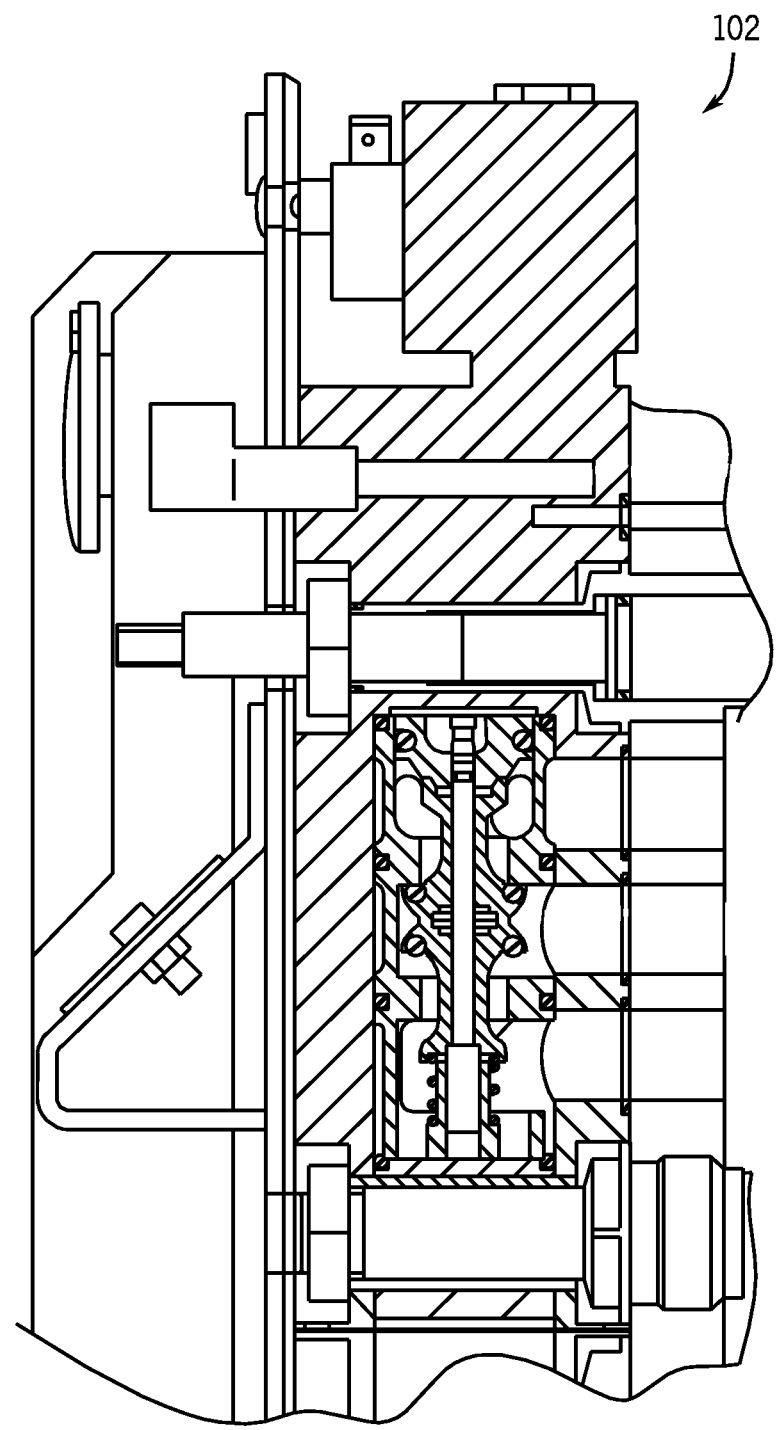
FIG. 3 is a partial cross-section of a EPVB in the IS machine illustrated in FIG. 2 configured to prevent operation of the blow head and blow mold from the blank side of the IS machine when the two P-Switch valves are activated.

The system 100 accomplishes such lockout by rerouting the pilot air of the individual pneumatic function at the blank side valve to a P-Switch switch 108 enabling or disabling the pneumatic function of the particular section 120. Referring to FIGS. 1-3, a schematic illustration of such routing of a piping network 130 from the pilot air supply 132 to the P-Switch valves 108 on a blow panel coupled to the EPVB 102 portion of an IS machine 110 illustrated in FIG. 2. The rerouting of the pilot air for the two functions to a blow side enabling or disabling switch simplifies the piping and operation of the IS machine 110 and complies with the appropriate European Union standards. As a further result of the rerouting of the pilot air with the disclosed system, there is no need for costly operating valves 126 on the blow side 112, a blow side low pressure air manifold 122, exhaust manifold 124 and a complicated section piping 126 as is typical in an IS machine.

In one embodiment, the system is added to the pilot air supply at the electro-pneumatic valve block (EPVB) 102 on the blow side 112 of the IS machine 110. In another embodiment, the pilot line is rerouted through a pneumatic switch 108 before it arrives at the valve block 102 thereby ensuring that the valve cannot be operated and that the manual operation is disabled. Such system 100 prevents inadvertent operation of a specific section 120 of the IS machine 110 thereby allowing the machine operator to correct any defects in the operation of that section of the IS machine 110.

The system 100, when installed, eliminates the need for the blow side operating valves 128 also known as ISO valves (mold open and close and blow head) costs and the associated costs of such valves and piping 126. The rerouting of the pilot air supply 132 of the present system eliminates the need for blow side manifolds 122, 124 thereby saving additional costs to manufacturer and operator. It is also determined that the piping 130 of air is less complicated because of the rerouting set up in the described system (See FIG. 2). With the IS machine system locked out, and prevented from manual override, an operator can repair, i.e. remove a defective container 136 from a mold 116, without concern that the IS machine section 120 will inadvertently operate before the required repair is accomplished.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the apparatus as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A system to control operation of a blow head and blow mold in at least one section on the blow side of an IS machine when a defective container in a mold must be removed, the IS machine including a blank side with a blank side pilot air supply, and an EPVB having an operation valve and pilot valve coupled to one of the blow head and blow mold, the system comprising:
   a pneumatic shut-off valve mounted on the blow side of the IS machine, with the pneumatic shut-off valve coupled to the EPVB and the blank side pilot air supply; and
   a piping network coupling the pneumatic shut-off valve to the pilot valve and to the blank side pilot air supply, with the pneumatic shut-off valve and piping network configured to prevent operation of the blow side mold and blow head from the blank side of the IS machine until the defective container is removed; and
   wherein activation of the pneumatic shut-off valve to prevent operation the blowside mold and blow head cuts off supply of pilot air to the pilot valve.

2. The system to control operation of a blow head and blow mold in at least one section on the blow side of an IS machine of claim 1, wherein the blank side pilot air supply of the IS machine is connected directly to the pneumatic shut-off valve through the piping network, then coupled to the EPVB.

3. The system to control operation of a blow head and blow mold in at least one section on the blow side of an IS machine of claim 1, further comprising one additional pneumatic shut-off valve coupled to the piping network and EPVB of the at least one section, with one pneumatic shut-off valve coupled to the blow head and one pneumatic shut-off valve coupled to the blow mold, with each respective pneumatic shut-off valve configured to set the blow head in an UP position and set the blow mold to an OPEN position.

4. The system to control operation of a blow head and blow mold in at least one section on the blow side of an IS machine of claim 1, wherein the piping network is configured without a blow side manifold coupled to the pneumatic shut-off on the blow side of the IS machine.

5. The system to control operation of a blow head and blow mold in at least one section on the blow side of an IS machine of claim 4, wherein the blank side pilot air supply of the IS machine is connected directly to each pneumatic shut-off valve through the piping network.

6. The system to control operation of a blow head and blow mold in at least one section on the blow side of an IS machine of claim 1, wherein the pneumatic shut-off valve and piping network is configured to prevent manual operation of the IS machine until the defective container is removed.

7. The system to control operation of a blow head and blow mold in at least one section on the blow side of an IS machine of claim 1, further comprising a pneumatic shut-off and piping network configured to prevent operation of the blow side mold and blow head from the blank side of the IS machine on at least one additional section of the IS machine.

8. A system configured to control operation of a blow head and blow mold in at least one section on the blow side of an IS machine, the system comprising:
   a blank side including a blank side pilot air supply;
   an electro-pneumatic valve block including an operation valve and a pilot valve;
   a blow head;

piping between the blank side pilot air supply and the electro-pneumatic valve block; and a pneumatic shut-off valve mounted on the blow side of the IS machine configured to control air flow between the blank side pilot air supply and the electro-pneumatic valve block;

wherein operation of the pneumatic shut-off valve is configured to cutoff the supply of pilot air to the electro-pneumatic valve block to disable the pneumatic function of the section.

9. The system of claim 8, wherein the pneumatic shut-off valve is configured to prevent overriding from the blank side.

\* \* \* \* \*